United States Patent

[11] 3,623,157

[72] Inventor Gary N. Stapleford
Nashua, N.H.

[21] Appl. No. 872,342

[22] Filed Oct. 29, 1969

[45] Patented Nov. 23, 1971

[73] Assignee Sanders Associates, Inc.
Nashau, N.H.

[54] BRANCH CONTROL OF ELECTROMECHANICAL DEVICES AND DISPLAY INFORMATION
8 Claims, 2 Drawing Figs.

[52] U.S. Cl. .......... 340/172.5, 35/35 R

[51] Int. Cl. .......... G06f 3/14, G06f 7/00, G09b 7/04

[50] Field of Search .......... 235/157; 340/172.5; 35/9, 35

[56] References Cited

UNITED STATES PATENTS 3,141,243 7/1964 Chapman et al. .......... 340/172.5 X 3,199,226 8/1965 Joslow .......... 35/35

3,414,887 12/1968 Scantlin .......... 340/172.5

3,501,851 3/1970 Price, Jr. et al. .......... 35/9

*Primary Examiner*—Raulfe B. Zache
*Assistant Examiner*—Melvin B. Chapnick
*Attorney*—Louis Etlinger

ABSTRACT: Information presented on a display screen is responded to by an operator and dependent on the operator's response the apparatus of the invention branches to another instruction presently available in the display system's recirculating memory or to a full page of instructions stored in an auxiliary memory. The instruction branched to causes information associated with it to be displayed for a further response by the operator and/or causes the main controller of the invention to activate one or more subcontrollers which in turn activate one or more electromechanical devices. For example, a student in response to a question displayed may select one multiple-choice answer. Dependent on this answer he may see further information displayed and in addition a short movie or group of slides presented, and still further, information might be played back from a tape recorder.

INVENTOR
GARY N. STAPLEFORD
BY John S. Solakian
ATTORNEY

BRANCH CONTROL OF ELECTROMECHANICAL DEVICES AND DISPLAY INFORMATION

BACKGROUND OF THE INVENTION

1. Field of the Invention

This invention relates to apparatus for branched programmable control of electromechanical devices and displayed information. More particularly, it relates to apparatus which responds to control such devices and the display of such information dependent on an operator's response.

2. Description of the Prior Art

In the prior art, updating of information on a display screen in response to one of a multiple of selections by an operator typically required the utilization of a computer in order that such new information be truly dependent of an operator's response. In a similar manner, control of electromechanical devices such as projectors and recorders were limited to on/off control, and the sequence of control was limited to the order in which such devices had this information stored therein. For example, slides inserted in a slide tray of a slide projector could be shown only in the sequence in which they were inserted. Essentially, the only way to change this sequence was by direct switch control or by interface with an expensive computer.

To the applicant's knowledge, these prior art devices did not present a complete system which was simple to operate wherein a single response by an operator to a question posed to him could cause a particular slide and/or movie sequence to be shown to him and/or a recording played back to him as well as additional text shown to him on the screen of a display system. A local bulk storage memory whose storage element could be easily replaced and which could be utilized in combination with the above system was also not available.

Such prior art devices were limited and were expensive especially where a computer was also utilized. Such limitations included difficulty of usage and complexity of operation and in addition required a rather large package of equipment. The expense of the system made it unavailable to certain users such as educational institutions.

SUMMARY AND OBJECTS OF THE INVENTION

Accordingly, it is an object of the invention to provide an improved apparatus for branched programmable control of electromechanical devices and display information.

Another object of the invention is to provide a branch controller which does not require an expensive computer.

Still another object of the invention is to provide a branch controller which can retrieve control instructions from either one of two memories dependent on an operator's response.

Yet another object of the invention is to provide a branch controller which can select an instruction and cause to be displayed text associated therewith as well as control the operation of a projector and/or tape recorder, dependent entirely on the response of an operator utilizing the apparatus.

The invention accordingly comprises the features of construction, combination of elements and arrangement of parts which will be exemplified in the construction hereinafter set forth and the scope of the invention will be indicated in the claims.

Briefly, the apparatus of the invention is utilized with a main controller described in copending application, Ser. No. 803,371, now U.S. Pat. No. 3,579,197 filed on Feb. 28, 1969, entitled "Apparatus for Programmable Control of Electromechanical Devices," and which is assigned to the assignee of the present invention. The apparatus of the present invention in combination with the main controller of the above-mentioned pending application is utilized for branching to instructions stored in a first memory and to a page of instructions stored in a second memory in response to an input selection signal. This selection signal might be generated by a student who energizes a switch which corresponds to one of several answers to a question posed to him. For example, in combination with a display system a question may be presented on the screen of the display and five possible answers may be located on the screen also. The switches might be a touch wire system wherein the touch wires are located just over or slightly under the possible answers. By touching one of these wires a student will give his response and from this response a subsequent page or further instruction or question will be presented on the display screen. In response to the student's answer the main controller might also in combination with a subcontroller select an electromechanical device such as a slide projector and display the selected slide on a screen, and/or another subcontroller might control a tape recorder and the student might hear in response to his answer a recorded message.

The apparatus of the entire invention has means for receiving an instruction of a page of instructions presently stored in the recirculating memory of the display system. The instructions include a plurality of fields, some of which fields indicate the number of another instruction on the present page in the recirculating memory and others of which indicate the number of another page of instructions stored in a second memory which second memory might be for example a magnetic drum or tape cassette. When the operator or student responds by energizing a switch, this response signal or input selection signal corresponds to one of the plurality of fields in the instruction. The apparatus then detects whether the field indicates an instruction number in the first memory, i.e., the recirculating memory, or a page number in the second memory. If the indication is a page number in the second memory, gating means allows the page number to address the second memory and the page corresponding thereto is then loaded into the recirculating memory, thereby displacing the page which had been previously stored in the recirculating memory. The entire page might then be displayed on the screen of the display system. If an instruction number is indicated, the instruction corresponding thereto is located and is either displayed or is utilized to select another question, or is used to control an electromechanical device, such as a slide projector.

Thus, the present system as can readily be seen, is especially useful as an educational teaching device. This is due to the ease of programming techniques used and the branch capability available. The total system gives a capability of presenting information on a display screen, slides or movies on a picture screen, and playback of recorded messages and in addition allows branching between instructions controlling these devices depending on the response to the system by the operator or student using it.

BRIEF DESCRIPTION OF THE DRAWINGS

The foregoing and other objects, features and advantages of the invention will be apparent from the following more particular description of the preferred embodiment of the invention as illustrated in the accompanying drawings in which.

DESCRIPTION OF THE PREFERRED EMBODIMENTS

Figures 1, 2:
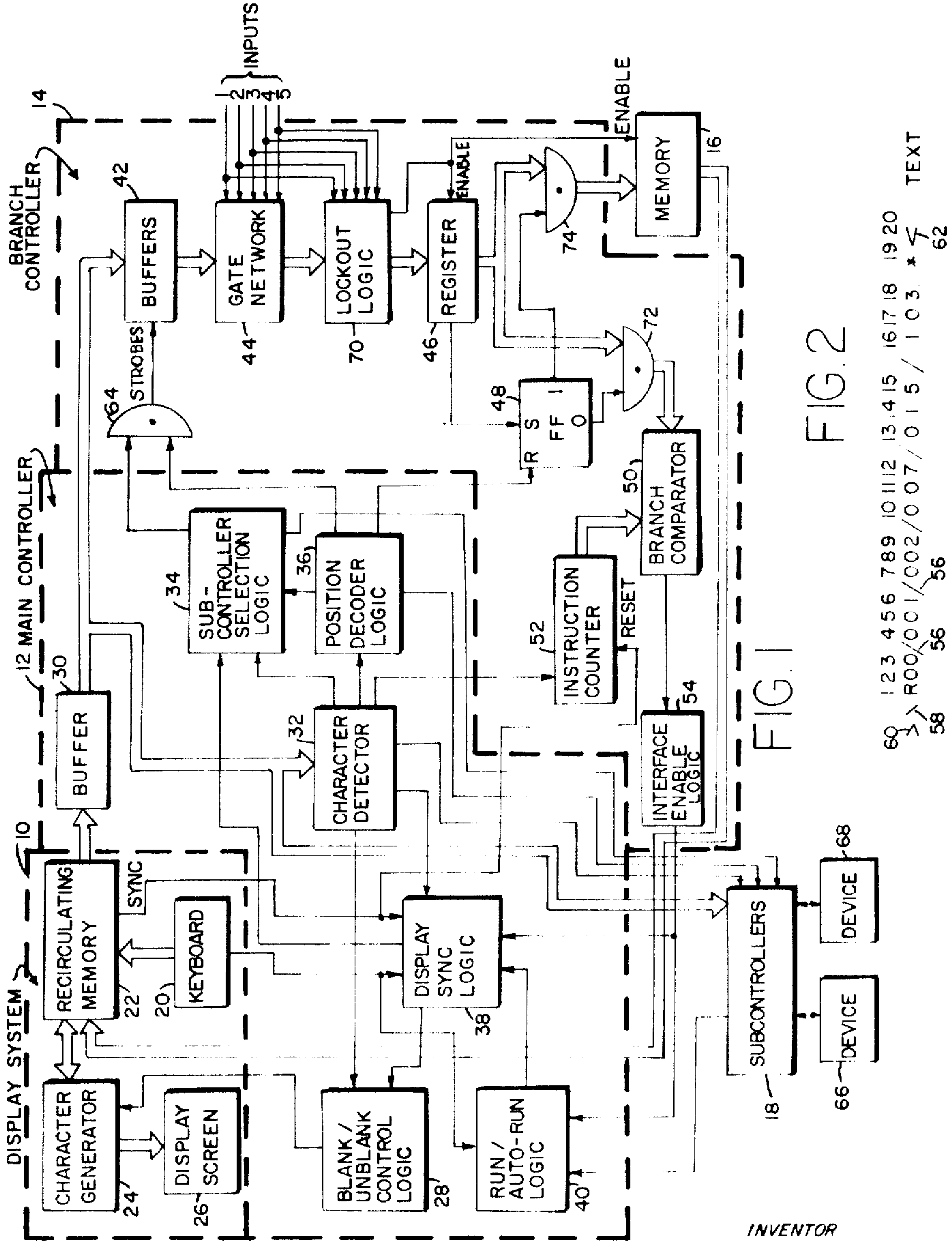
FIG. 1 is a schematic block diagram of the apparatus of the present invention.
FIG. 2 is an illustration of a single instruction word utilized with the apparatus of the invention.

Now referring to FIG. 1 there is illustrated a general schematic block diagram of the apparatus embodying the invention. The apparatus comprises the display system 10, main controller 12, branch controller 14 and memory 16. The apparatus may also include additional subcontrollers 18. Display system 10 includes a keyboard 20, a recirculating memory 22, a character generator 24 and a display screen 26. The keyboard 20 is utilized to insert and update instructions as well as text in the recirculating memory 22. Character generator 24 receives information for presentation on display screen 26 from the memory 22. Character generator 24 is blanked and unblanked by the blank/unblank control logic 28 of main controller 12. Recirculating memory 22 also receives updating information from memory 16. Display system 10 is coupled to send information to buffer 30 of main controller 12. Memory 22 might be a random-access-type memory also.

Main controller 12 additionally includes a character detector 32 coupled to the output of buffer 30 which detector 32 is utilized to determine the special characters of an instruction word emitted from memory 22. Such special characters include blank and unblank control characters, field separator characters, subcontroller designators, instruction indicators and an execution command character.

A subcontroller election designator is coupled to subcontroller selection logic 34 which is utilized to energize the subcontroller designated. In the illustration, subcontrollers 18 and subcontroller or branch controller 14 are so coupled. The field indicator characters (the forward slashes 52 in FIG. 2) are coupled to the position decoder logic 36 which is utilized to strobe the information from buffer 30 of the main controller 12 into the selected subcontroller buffers. Position decoder logic 36 is also utilized to reset certain elements in the subcontrollers. The instruction designators are utilized to control the display sync logic 38, which logic, in the apparatus of the present invention, is additionally controlled by the branch subcontroller 14. The blank/unblank control characters are used to control the display on the display screen 26 via the blank/unblank control logic 28. The run/autorun logic 40 is used to start the operation of the system by means of either the keyboard 20 or one of the subcontrollers 18 or branch controller 14. In addition, the display sync logic 38 is required to determine the zero or home address in recirculating memory 22, i.e., that position which corresponds to the uppermost left-hand corner of display screen 26. Display sync logic 38 in turn has some control over the blank and unblanking function as well as the subcontroller selection. However, the display sync logic 38 is in turn controlled by the run/autorun logic 40 as well as branch controller 14.

A more detailed explanation and description of the blank/unblank control logic 28, subcontroller selection logic 34, position decoder logic 36, display sync logic 38 and run/autorun logic 40 circuits associated with the main controller 12 may be had by referencing the patent application cited hereinabove. In addition, the character detector logic may be any suitable character-decoding circuits which are required to detect only certain ones of a class of codes, such as the circuits described on pages 100–102 of text, *Electronic Digital Techniques*, McGraw-Hill Book Company, 1968, by Paul M. Kintner. The character generator 24 may also employ any suitable character-generating scheme and circuits and may typically employ a racetrack scheme and circuits, such as shown in U.S. Pat. No. 3,423,626 of Richard Bouchard et al.

Branch controller 14 is adapted to receive an instruction word from recirculating memory 22 via main controller 12. Once this instruction word is strobed into the multiple buffers 42, the operator may then make a selection. This selection might be made, for example, by observing the display screen 26 which might contain one question and five possible answers. By selecting one of these five possible answers one of the input lines to gate network 44 will be energized. The inputs may be under the control of a simple toggle switch or might be a touch wire system wherein one touch wire is positioned adjacent to each of the answers on the screen 26. Depending on which input line is energized, gate network 44 will allow a portion of the information now contained in buffers 42 to be transferred to register 46. This portion of information will be discussed hereinafter and is generally referred to as a field of information. In general, depending on the operator's response a new question will be posed on the screen 26 along with associated answers or one of the subcontrollers 18 may be placed in operation thereby controlling, for example, a tape recorder, a slide projector, or perhaps a movie projector. The response may initiate the transfer of a new page of information from memory 16 to recirculating memory 22 and subsequently to display screen 26. This branching is preprogrammed but because of the flexibility of the instruction words they may be changed directly by the keyboard 20 or by replacing the contents of memory 16. This is possible since memory 16 might be, for example, a tape cartridge memory or a tape drum memory wherein the tapes are easily interchangeable.

Now having a field of information corresponding to the operator's response stored in register 46, a determination is made by branch controller 14 as to whether another instruction word now contained in recirculating memory 22 will be located or whether a new page of information will be transferred from memory 16 to recirculating memory 22. The first bit of information in this field of information will determine this and by means of a flip-flop 48 will transfer the contents of register 46 either to memory 16 or to branch comparator 50.

If the contents of register 46 are employed to address memory 16 then the page corresponding to this address will be transferred to memory 22. If, however, this field of information in register 46 is transferred to the branch comparator 50, the logic of the apparatus will search for the instruction of memory 22 corresponding to the instruction number in that field of information. As illustrated, register 46 addresses memory 16 in a parallel input arrangement. If memory 16 must be addressed by a series of bits only, i.e., one bit at a time, then a shift register, not shown, might be utilized to receive information from register 46 in parallel and emit the same information to memory 16 in series.

As stated before, character detector 32 detects the instruction designators and since display sync logic 38 detects the zero position in memory 22, instruction counter 52 will count from this zero position for each instruction in memory 22. Once the number in register 46 compares with the count from instruction counter 52, branch comparator 50 will emit a change in level-type signal allowing the interface enable logic 54 to reactivate the display sync logic 38 and indicate to the run/autorun logic 40 that a new instruction may be executed. The purpose of the interface enable logic 54 is to convert the transition signal at its input to a pulse-type signal which is necessary to activate the run/autorun logic as illustrated in the aforementioned copending application. To this end, interface enable logic 54 may suitably be a monostable multivibrator of the type described in chapter 6 of the text, *Pulse and Digital Circuits*, McGraw-Hill Book Co., 1956, by Jacob Millman and Herbert Taub. This instruction now located in memory 22 may then be displayed on display screen 26 or may, as indicated hereinabove, be utilized to control the other subcontrollers 18.

Now referring to FIG. 2, a typical branch instruction is illustrated. As in the above-referenced patent application, the instruction word is divided into six fields, the fields being separated by forward slashes 56 with each field having three bit positions. An instruction indicator, the backward slash 58, precedes each such instruction word. If it is desired that the instruction word not be displayed on the screen 26 then a blank control character 60 is placed before the backward slash 58. If it is then desired to display text associated with the particular instruction then an unblank control character 62 is placed at bit position 20. The text in this example could be the question and the five possible answers previously discussed. In addition to these special characters an execute control character is placed in position 19. This character controls the start of any designated subcontroller response.

Field 1 which is indicated by positions 1, 2 and 3 is partly utilized in position 1 to indicate the subcontroller to be activated. In this example, a letter R, which is detected by character detector 32 is used to designate that the branch controller 14 be energized. Positions 2 and 3 are not utilized with the branch controller instruction. The remaining five fields, as indicated by positions 4 through 18, correspond to one of the five possible selections which might be made by an operator. The first bit in each of these fields (positions 4, 7, 10, 13 and 16) indicates whether an instruction already contained in the recirculating memory 22 is to be located or whether a new page in memory 16 is to be transferred to memory 22. Thus, if the first position of the field is a zero, this will indicate that the system is to branch to another instruction already contained in memory 22. The instruction number will be indicated by the second and third positions in the field, for example, in field 2 by positions 5 and 6. If the first position in the field is a logical one this will indicate that a new page is to be addressed and transferred from memory 16 to memory 22. The page number will be indicated by the second and third positions of the field.

Thus, for example, field 2 as indicated by positions 4 through 6 indicates that instruction number 1 is to be located in recirculating memory 22. Field 5 indicates that instruction number 15 is to be located in recirculating memory 22. Field 6, however, indicates that page number 3 is to be addressed in memory 16 and transferred to recirculating memory 22. Which instruction is branched to or located or which page in memory 16 is selected depends, of course, upon the operator's response at inputs 1 to 5.

The operator's responses might be recorded for later inspection by the operator and by, for example, his instructor or for example by a medical person for evaluation. Such responses could be recorded on a further storage means (not shown) and would be stored in context with the associated information, i.e., the file number, page number and the instruction number responded to.

Having described in general terms the configuration of the apparatus of the invention and having described a typical branch instruction which is associated therewith, the operation of the total system will now be described. Let us assume that the operator has selected the third input which corresponds to field 4 or namely positions 10 through 12 of the instruction shown in FIG. 2. This indicate that instruction number 7 is to be located in memory 22.

The initial conditions are given to be that the branch instruction of FIG. 2 is now located in recirculating memory 22 of display system 10. This instruction has been transferred to buffer 30 in main controller 12. The output of buffer 30 is coupled to the input of character detector 32 which will detect any special characters in the branch instruction. The first character detected is blank control character 60 which causes the detector 32 to command the blank/unblank control logic 28 to blank the display screen 26 for subsequent characters. This means that the instruction of FIG. 2 will not be displayed on the screen 26.

When instruction designator character 58 is detected by character detector 32 the display sync logic 38 will be enabled but only after a run/autorun signal is generated by logic 40. This will partially enable subcontroller selection logic 34. Logic 34 will be fully enabled upon receipt of a subcontroller selection character as indicated in position 1 of the instruction word. In this example, the branch instruction contains a branch subcontroller designator which will therefore enable the branch controller 14 via the AND-gates 64. With the entire instruction word now stored in buffer 30, upon receipt of the execute character in position 19 this instruction word will be strobed into buffers 42 of branch controller 14. Position decoder logic 36 generates these strobes which fully enable AND-gates 64 and thus allow the characters in buffer 30 to be transferred to the multiple buffers 42. Multiple buffers 42 actually include five buffer registers, each of which will accept one field of information from the instruction word.

Position decoder logic 36 detects the field separators 56 and also detects the individual characters in the separate fields. Field separators are primarily utilized to organize the instruction word so that field characters may be eliminated while still retaining the instruction length. For example, two consecutive field designators may be used to eliminate the requirement for the field of information thereby saving memory space. For example, in the illustration where the question shown on display screen 26 has just four possible answers, the requirement for an extra field is eliminated and thus no characters in the field need be written into the memory. Of course, it should be understood that additional fields could be added without departing from the scope of the invention.

Thus, position decoder logic 36 generates strobes 1, 2 and 3 wherein strobe 1 is utilized to partially energize subcontroller selection logic 34 and wherein strobes 4 through 18 are utilized to allow the transfer of information from buffer 30 to buffers 42.

Upon detection of the unblank control character 62 in position 20 of the instruction word the text associated with the branch instruction is now displayed on screen 26 and accordingly the operator is ready to make a response. In this example, the operator responds by energizing input 3 of gate network 44. Input 3 corresponds to field 4 of the instruction word which means that instruction number 7 is to be located in recirculating memory 22. Instruction number 7 may be the type of instruction referenced in the above-referenced application wherein additional subcontrollers 18 may be activated to control one or more devices 66 and 68. These devices as mentioned previously may include projectors, recorders, and the like and as such are responsive to the operator's answer. For example, if the question is "Do you smoke?" and the answer given by the operator is "very heavily," then the recording may recite facts important to heavy smokers and/or simultaneously a projector may show the effects of heavy smoking to an individual. The instruction branched to, i.e., instruction number 7, might also include further text which could be displayed on screen 26 in combination with any other subcontroller operation. For example, the text may be a printout of the recording.

The gate network 44 allows one of the fields of information to pass depending on the input energized. The network 44 comprises a matrix which includes gates that are selectively enabled by means of the input signals. For instance, matrix 44 includes separate two-input coincidence gates for each of the bit positions 4 through 18 (FIG. 2) with the different response signal lines 1 through 5 acting as transfer enable signals for the gates in different ones of the fields. Thus, each gate may be of the diode transistor type shown at page 14 of the aforementioned Kintner text. In this example, field 4 will be passed from network 44 through lockout logic 70 and into register 46. Lockout logic 70 generates an enable signal which allows register 46 to accept the information and additionally allows memory 16 to be addressed. This enable signal will be emitted when the lockout logic detects the presence of only one field of information from network 44. To this end, the lockout logic 70 is shown in FIG. 1 to also receive the student response inputs 1 to 5 so as to detect the near simultaneous selection of two or more responses. If the operator has simultaneously selected more than one input response, then lockout logic 70 will reject the information received, thus forcing the operator to select his response again. Additionally, lockout logic 70 disables the operator from selecting a second response for a predetermined time duration after he has selected his first response. This enables the system to process the instruction before receiving a further response. The lockout logic 70 may be of any conventional design and may suitably employ the circuits used in the electronic interlock sections of commercially available keyboards.

The first bit of information contained in register 46 which register now contains three bits of information making up the field is checked by flip-flop 48 to determine whether or not it is a logical one or a logical zero. If it is a logical one, it will set the flip-flop. If it is a logical zero, the flip-flop will remain reset. In this example, it will remain reset thus producing a logical one from the zero output of flip-flop 48. This logical one signal will enable AND-gates 72 to pass the field of information contained in register 46 to branch comparator 50. Branch comparator 50 will now compare this number with the output of instruction counter 52. Instruction counter 52 is reset each time recirculating memory 22 generates a synch pulse which indicates the zero position in said memory. From this zero or home position, character detector 32 sequentially detects the instruction designator characters 58 of the respective instruction words. Each time it detects one of these instruction designators, instruction counter 52 is incremented by one.

When the count in counter 52 is equal to the instruction number in the field of information presented to the other input of branch comparator 50, comparator 50 will then emit a signal to the interface enable circuit 54. Interface enable circuit 54 will then enable the main controller 12 so that it is free to process any further instruction. The instruction, in this example, which is to be processed is instruction number 7 of the page now stored in recirculating memory 22. It should be noted that the character detector 32 upon detection of the branch subcontroller designator R disables main controller 12 via the illustrated connection to the display sync logic 38. This allows the branch controller to locate the instruction or page indicated in the present instruction word and prohibits any further commands to other subcontrollers.

In the example illustrated above, an instruction has been located in recirculating memory 22 which corresponds to the response of an operator. If the operator's response to a question such as "Do you smoke?" was "not at all," then perhaps a new page of information might have to be transferred to memory 22. This new page of information would in all probability make no reference to smoking. It might include an entirely new subject matter, pertaining to other characteristics of people. If this response corresponds to input number 5 of network 44 then field number 6 of the branch instruction of FIG. 2 would be enabled into register 46. This field indicated by positions 16, 17 and 18 would indicate that page 3 in memory 16 is to be transferred into recirculating memory 22. The system could be set up so that the first instruction and text associated therewith in page 3 would be displayed on screen 26 thereby allowing the operator to immediately make a further response.

With a one in the first bit position of the field, flip-flop 48 will be set thereby enabling AND-gates 74 to pass the field of information and address memory 16. Memory 16 upon finding the page associated with the address, namely, page 3, will transfer the contents of the entire page into recirculating memory 22. Memory 16, of course, would retain the entire page while still transferring it. Memory 16 might as stated hereinabove be a tape memory which might be easily changed so that large amounts of possible pages of information and programs associated therewith might be inserted for the particular application involved, whether it be in the classroom as an educational device, whether it be used in the marketing industry, or whether it be used in medical or military applications.

It will thus be seen that the objects set forth above among those made apparent from the preceding description, are efficiently attained, and since certain changes may be made in the above construction without departing from the scope of the invention, it is intended that all matter contained in the above description or shown in the accompanying drawings shall be interpreted as illustrative and not in a limiting sense.

Having described the invention, what is claimed as new and secured by Letters Patent is:

1. Apparatus for branching to instructions stored in a first memory and to a page of instructions stored in a second memory in response to an input selection signal, said apparatus comprising:

A. means for receiving an instruction of a page in instructions stored in said first memory, some of said instructions including a plurality of fields, some of said fields indicating the number of another instruction in said page of instructions in said first memory and some of said fields indicating the number of another page of instructions stored in said second memory;

B. means for generating said input selection signal;

C. means for selecting one of said fields in response to said selection field;

D. means for detecting whether said selected field indicates an instruction number in said first memory or a page number in said second memory;

E. gating means for addressing said second memory with said selected field and loading said first memory with said page in said second memory corresponding to said page number when said selected field indicates a page number; and F. means for locating an instruction in said first memory corresponding to said instruction number of said selected field when said selected field indicates an instruction number.

2. Apparatus as defined in claim 1 wherein said corresponding instruction includes associated information and further including:

A. a display system for the visual presentation of said associated information and said instructions stored in said first and second memories; and B. means for transferring said associated information to said display system for presentation thereon.

3. Apparatus as defined in claim 2 further including means for selectively displaying said corresponding instruction.

4. Apparatus as defined in claim 1

A. wherein said first and second memories include additional instructions for control of electromechanical devices, said additional instructions including a plurality of fields, said fields of said additional instructions indicating the type of electromechanical device to be controlled, the speed of operation of said device, and the address of operation of said device; and B. further including electromechanical device control apparatus for accepting said additional instructions and for generating corresponding control signals for operation of said devices.

5. Apparatus as defined in claim 4 wherein said electromechanical device is a projector.

6. Apparatus as defined in claim 4 wherein said electromechanical device is a recorder.

7. Apparatus as defined in claim 4 wherein each of said additional instructions includes associated information and further including:

A. a display device; and

B. means for transferring said associated information of said additional instructions to said display device for presentation thereon.

8. Apparatus as defined in claim 1 further including:

A. apparatus for displaying symbols;

B. wherein said addressed page in said second memory includes a first instruction and wherein said first instruction includes information associated therewith; and C. means for transferring said associated information to said apparatus for displaying symbols and displaying said information thereon in order that an operator might generate an input selection signal in response thereto.

* * * * *